United States Patent
Pelletier

(10) Patent No.: US 9,477,036 B2
(45) Date of Patent: Oct. 25, 2016

(54) POST-ASSEMBLY WAVELENGTH-TUNING METHOD FOR AN OPTICAL FIBER FILTER

(71) Applicant: TERAXION INC., Québec (CA)

(72) Inventor: François Pelletier, Québec (CA)

(73) Assignee: TERAXION INC., Québec, QC (CA)

( * ) Notice: Subject to any disclaimer, the term of this patent is extended or adjusted under 35 U.S.C. 154(b) by 0 days.

(21) Appl. No.: 14/718,273

(22) Filed: May 21, 2015

(65) Prior Publication Data
US 2015/0338574 A1    Nov. 26, 2015

Related U.S. Application Data

(60) Provisional application No. 62/001,196, filed on May 21, 2014.

(51) Int. Cl.
*G02B 6/34*    (2006.01)
*G02B 6/02*    (2006.01)
(Continued)

(52) U.S. Cl.
CPC ........... *G02B 6/02195* (2013.01); *B23K 26/21* (2015.10); *B23K 26/262* (2015.10); *B23K 26/282* (2015.10); *B23K 26/32* (2013.01); *B23K 26/34* (2013.01); *G02B 6/022* (2013.01); *G02B 6/0218* (2013.01); *G02B 6/02209* (2013.01); *B23K 2201/04* (2013.01); *B23K 2203/166* (2015.10)

(58) Field of Classification Search
None
See application file for complete search history.

(56) References Cited

U.S. PATENT DOCUMENTS

| 6,087,621 A * | 7/2000 | Kang | B23K 26/20 219/121.64 |
| 6,184,987 B1 * | 2/2001 | Jang | G01D 5/268 356/388 |
| 6,327,405 B1 * | 12/2001 | Leyva | G02B 6/0218 385/12 |

(Continued)

FOREIGN PATENT DOCUMENTS

WO    98/59267    12/1998
WO    WO 01/48522 A2 *    7/2001

OTHER PUBLICATIONS

Zhou, Jun et al, Thermal-Mechanical Modeling of Pulsed Laser Keyhole Welding of 304 Stainless Steels, Journal of Engineering and Technology, 2012, p. 172-179, vol. 1, No. 3.

(Continued)

*Primary Examiner* — Mike Stahl
(74) *Attorney, Agent, or Firm* — Baker & Hostetler LLP

(57) ABSTRACT

A post-assembly wavelength-tuning method for an optical filter provided along an optical fiber mounted under tension in a packaging assembly is provided. The packaging assembly includes at least one packaging component mechanically coupled to the optical fiber and optically accessible from outside of the packaging assembly. The method includes a step of measuring a post-assembly spectral response of the optical filter and determining therefrom a spectral deviation with respect to a target spectral response. The method also includes a step of forming one or more laser-welded zones on the packaging component so as to cause a permanent deformation thereof. The permanent deformation induces a modification in length of the optical fiber, thereby changing the post-assembly spectral response of the optical filter to compensate for the measured spectral deviation.

38 Claims, 11 Drawing Sheets

(51) Int. Cl.
*B23K 26/34* (2014.01)
*B23K 26/32* (2014.01)

(56) References Cited

U.S. PATENT DOCUMENTS

| | | | | |
|---|---|---|---|---|
| 6,349,165 B1* | 2/2002 | Lock | ................... | G02B 6/0218 385/127 |
| 6,356,681 B1* | 3/2002 | Chen | ................. | G02B 6/02123 372/102 |
| 6,393,181 B1* | 5/2002 | Bulman | ................ | G02B 6/022 385/123 |
| 6,859,583 B2 | 2/2005 | Lachance et al. | | |
| 6,865,319 B2 | 3/2005 | Painchaud et al. | | |
| 6,879,755 B2 | 4/2005 | Morin et al. | | |
| 6,941,044 B2 | 9/2005 | Painchaud et al. | | |
| 7,711,224 B1 | 5/2010 | Pelletier et al. | | |
| 2003/0026534 A1* | 2/2003 | Skull | .................... | G02B 6/0218 385/27 |
| 2003/0039448 A1* | 2/2003 | Ting | .................. | G02B 6/02204 385/43 |
| 2005/0041543 A1* | 2/2005 | Ono | .................... | G02B 6/4204 369/44.32 |

OTHER PUBLICATIONS

Costa, J.M. et al, Residual Stresses Analysis of ND-YAG Laser Welded Joints, Engineering Failure Analysis, 2009, doi:10.1016/j.engfailanal.2008.11.001.

Chandler, H. et al, Heat Treater's Guide: Pratices and Procedures for Irons and Steels, Materials Park, OH: ASM Int., 1995, chapter 1, p. 5-6.

* cited by examiner

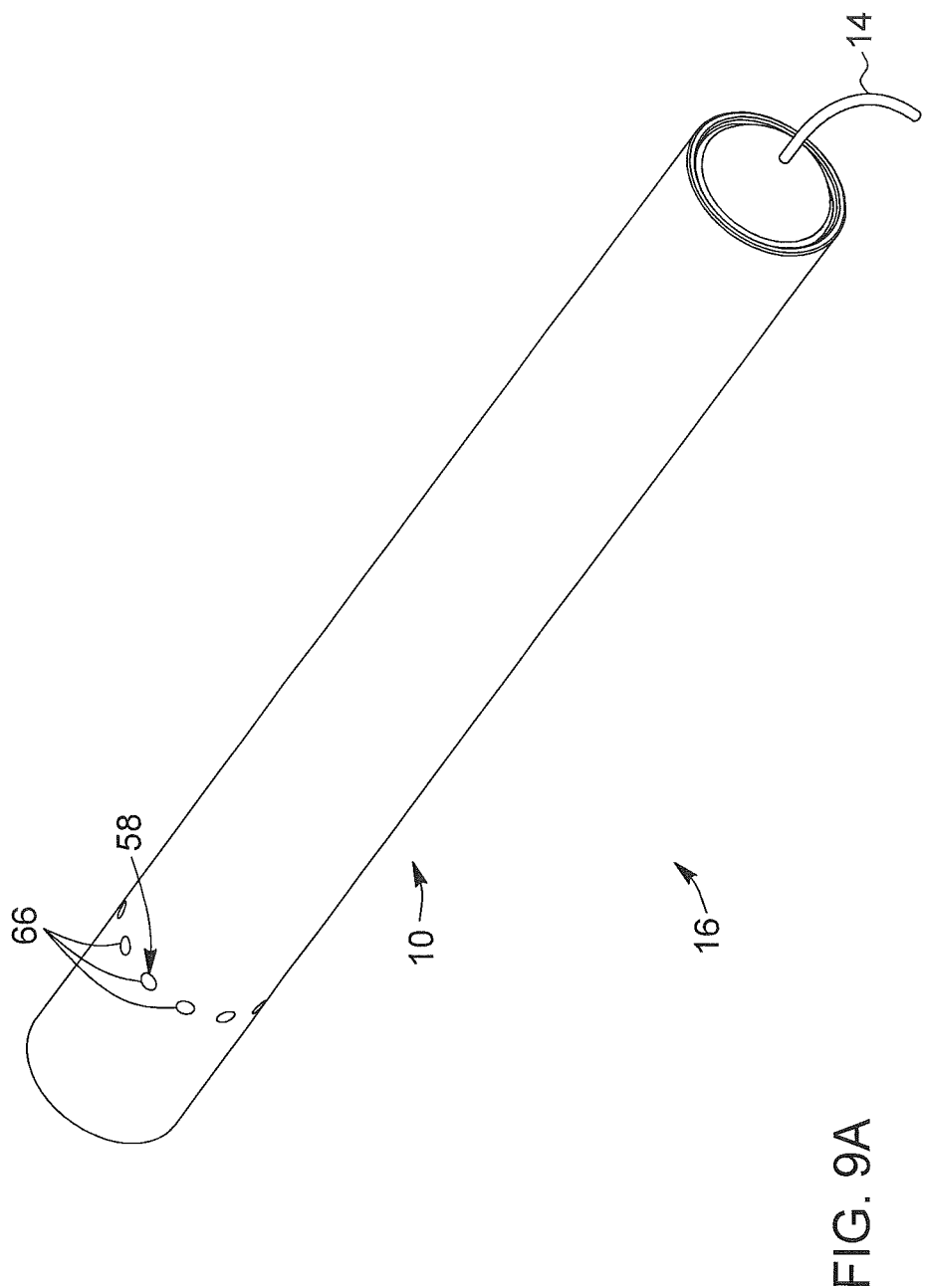

POST-ASSEMBLY WAVELENGTH-TUNING METHOD FOR AN OPTICAL FIBER FILTER

RELATED PATENT APPLICATION

This patent application incorporates by reference, in its entirety, and claims priority to U.S. Provisional Patent Application No. 62/001,196 filed May 21, 2014.

TECHNICAL FIELD

The general technical field relates to the field of optical filters and, in particular, to a post-assembly method for adjusting the spectral response of a fiber-based optical filter mounted in a packaging assembly.

BACKGROUND

Optical filters, such as fiber Bragg gratings (FBGs) and the like, are common components in optical fiber-based systems for use in various application fields such as information and telecommunication technologies. FBGs generally consist of patterns of refractive-index variations provided along a section of an optical fiber, which give rise to a high reflectivity in a specific narrowband wavelength region. The strongest reflection of light generally occurs at the Bragg wavelength, whose value depends on the period of the refractive-index variations (i.e., the grating period) and the average effective refractive index of light in the grating region.

Both the grating period and the average effective refractive index vary nearly linearly in response to a tensile load applied to the fiber such that a relative shift in Bragg wavelength also exhibits a nearly linear dependence on the applied tensile load. The Bragg wavelength is generally adjusted by mounting the section of optical fiber along which the optical filter is provided under tension in a packaging assembly, and by controlling the applied tensile load to tune the Bragg wavelength.

The Bragg wavelength of FBG-based optical filters also varies nearly linearly with temperature. To ensure that the spectral response of the FBG remains unaffected when the optical fiber undergoes temperature variations, it is known to package the optical filter in a passive temperature-compensation assembly that acts to control the temperature-induced elongation of the optical fiber containing the FBG. This is usually achieved by fixing the optical fiber to a mechanical structure that imposes a negative elongation (i.e., a contraction) to the fiber when the temperature rises. This contraction of the fiber compensates for the increases of its refractive index with temperature and, thus, allows the Bragg wavelength to be stabilized against temperature fluctuations.

Passive temperature compensation can also be achieved through the principle of differential thermal expansion, which usually involves clamping the fiber containing the FBG to a structure made of materials having different and usually positive coefficients of thermal expansion (CTEs). This structure is arranged such that the CTEs of the different structural elements supporting the fiber cause an overall negative elongation of the fiber when the temperature rises. Typically, the fiber is stretched out at low temperatures and allowed to relax as the temperature increases.

One drawback of optical-filter packaging techniques is that their manufacturing accuracy does not typically lead to a very precise adjustment of the Bragg wavelength. In fact, the assembly process, along with environmental stress screening testing, may induce errors that can cause the Bragg wavelength to deviate from its target value by several picometers (pm) to up to a few hundred pm. While some optical applications can tolerate such deviations, there are several applications where they are unacceptable and other applications that would benefit from increased wavelength accuracy. Currently available packaging techniques either suffer from a lack of precision or rely on active tunable systems to achieve an adequate precision. Although some of these active systems may provide satisfactorily optical performance in some implementations, they tend to be bulky, costly to operate and to require constant power input.

Accordingly, many challenges remain in the development of methods and packaging techniques for fiber-based optical filters that can alleviate wavelength inaccuracies originating from their manufacturing process while providing a simple, compact and passive implementation.

SUMMARY

According to an aspect, there is provided a post-assembly wavelength-tuning method for an optical filter provided along an optical fiber mounted under tension in a packaging assembly, the packaging assembly including at least one packaging component mechanically coupled to the optical fiber and optically accessible from outside of the packaging assembly. The method includes:
  a) measuring a post-assembly spectral response of the optical filter and determining therefrom a spectral deviation with respect to a target spectral response; and
  b) forming one or more laser-welded zones on the packaging component so as to cause a permanent deformation thereof, the permanent deformation inducing a modification in length of the optical fiber and thereby changing the post-assembly spectral response of the optical filter to compensate for the measured spectral deviation.

According to another aspect, there is provided a packaged optical filter device including:
  an optical fiber having an optical filter provided therealong; and
  a packaging assembly in which the optical fiber is mounted under tension, the packaging assembly including at least one packaging component mechanically coupled to the optical fiber and optically accessible from outside of the packaging assembly, one or more laser-welded zones being formed on and causing a permanent deformation of the packaging component, the permanent deformation inducing a modification in length of the optical fiber and thereby compensating for a spectral deviation from a target spectral response.

Other features and advantages of the embodiments of the present invention will be better understood upon reading of preferred embodiments thereof with reference to the appended drawings.

BRIEF DESCRIPTION OF THE DRAWINGS

FIG. 9A is a schematic perspective view of a laser-welded packaged optical filter device, in accordance with another embodiment.

DETAILED DESCRIPTION

Figure 1:
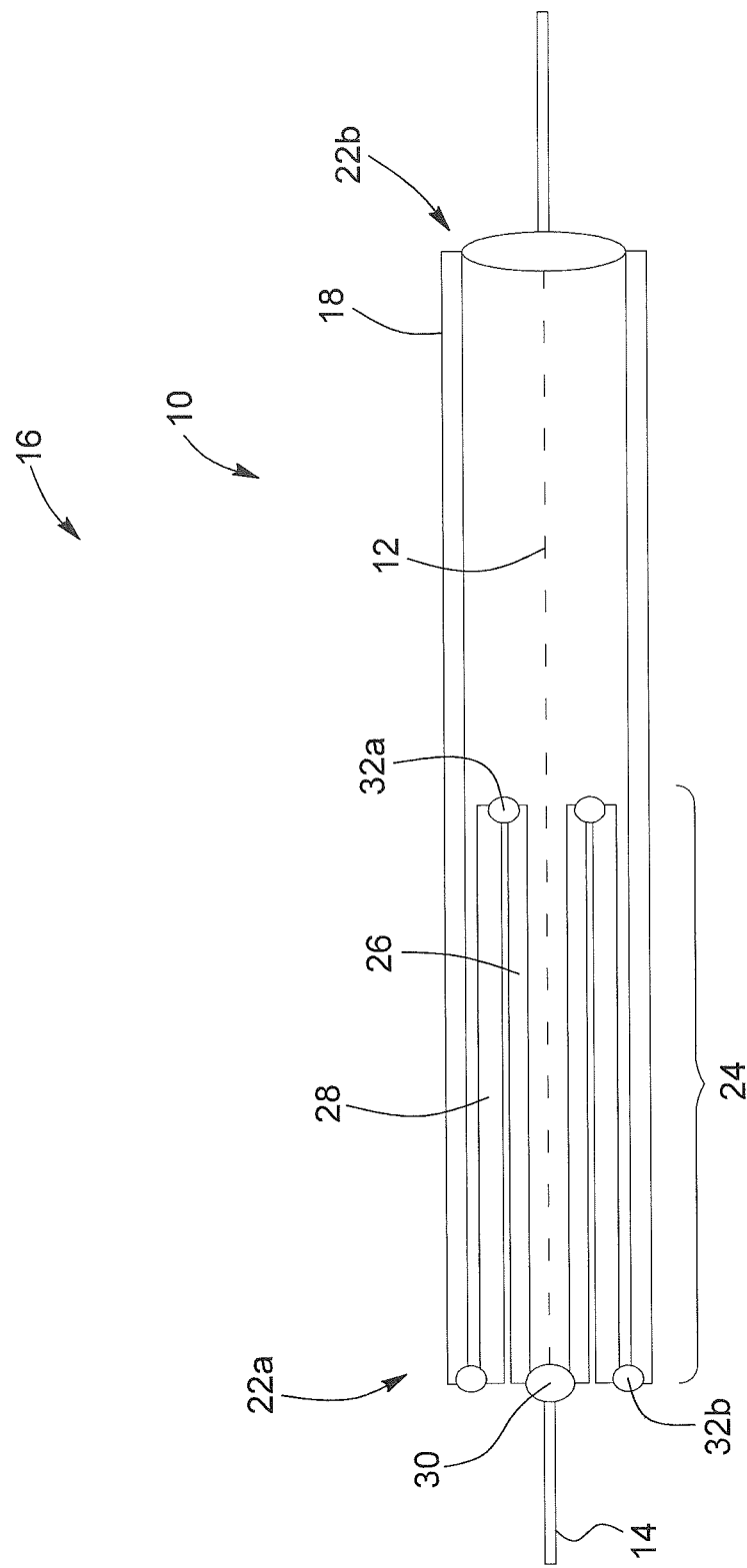
FIG. 1 is a schematic representation of components of a passive athermal packaging assembly.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.
General Overview The present description generally relates to a post-assembly wavelength-tuning method for an optical filter provided along an optical fiber mounted under tension in a packaging assembly. The packaging assembly includes at least one packaging component that is both mechanically coupled to the optical fiber and optically accessible from outside of the packaging assembly. The present description also generally relates to a packaged optical filter device including an optical fiber with an optical filter provided therealong and a packaging assembly in which the optical fiber is mounted under tension. For simplicity, the expression "packaged optical filter device" may, in some instances, be shortened to "packaged filter device", "optical filter device" or, simply, "packaged device".

Broadly described, and as discussed further below, the post-assembly wavelength-tuning method includes a step of measuring a post-assembly spectral response of the optical filter and determining from this measured post-assembly spectral response a spectral deviation with respect to a target spectral response. The method also includes a step of forming one or more laser-welded zones on the packaging component so as to cause a permanent deformation thereof. The permanent deformation undergone by the packaging component results in a modification in length of the optical fiber, and thereby changes the post-assembly spectral response of the optical filter to compensate for the measured spectral deviation.

The techniques described herein may be useful in applications where a repeatable and accurate post-assembly method for correcting manufacturing-related inaccuracies in the spectral response of packaged optical filters is desired or required. By way of example, the techniques described herein may be applied to or implemented in various types of packaged fiber-based optical filters including, without limitations, FBG-based devices and components used for: (i) chromatic dispersion compensation for telecommunication applications; (ii) narrowband optical filtering for sensing and telecommunication applications (iii) reflectors for fiber lasers; (iv) dispersion management in ultrafast fiber lasers; (v) pulse stretching for ultrafast fiber lasers; (vi) gain flattening filters; and (vii) pass-band filters.

As used herein, the term "post-assembly" refers to the fact that the techniques described herein can be performed after the optical filter device has been fabricated, packaged and tested, and without requiring it to be, partially or entirely, disassembled, opened, removed or otherwise reconfigured.

As used herein, the term "optical filter" refers to any optical element that selectively removes or filters out, totally or partially, either by reflection or transmission, light with specific wavelengths from an incident optical signal. As also used herein, the terms "light", "optical" and variants thereof are intended to refer to electromagnetic radiation in any appropriate region of the electromagnetic spectrum, and are not limited to visible light but may also include the microwave, infrared and ultraviolet ranges. By way of example only, the terms "light" and "optical" may encompass electromagnetic radiation with a wavelength ranging from about 1260 to 1675 nanometers (nm) in embodiments for use telecommunication applications, electromagnetic radiation with a wavelength ranging from about 900 to 2000 nm in embodiments for use in sensing applications, and electromagnetic radiation with a wavelength ranging from about 500 to 2400 nm in embodiments for use in power applications.

In some implementations, the optical filter may be embodied by a fiber Bragg grating. As used herein, the term "Bragg grating", or simply "grating", is understood to refer to a periodic or aperiodic refractive index pattern permanently provided in the optical fiber. The Bragg grating can be characterized by a spectral response, which defines reflection or transmission characteristics of light incident on the grating as a function of wavelength. The spectral response of the Bragg grating may include a single or a plurality of wavelength channels and may be chirped, slanted, sampled, or involve more than one such characteristics. In the multichannel case, the reflection or transmission profile of the grating as a function of wavelength shows a plurality of generally periodical features. Depending on its intended operation, the Bragg grating may reflect light at a single or at multiple wavelengths, the latter especially for telecommunications. By way of example, in one particular embodiment, the Bragg grating may be a multi-channel optical structure for the compensation of chromatic dispersion such as for example disclosed in U.S. Pat. No. 6,865,319 (PAINCHAUD), U.S. Pat. No. 6,941,044 (LELIÈVRE et al.) and U.S. Pat. No. 6,879,755 (MORIN et al.), the entire contents of each of which are incorporated herein by reference.

The optical fiber hosting the optical filter may be single mode or multimode and be provided with a single or multiple cladding. The optical fiber may be embodied by a standard fiber, a polarization maintaining (PM) fiber, a microstructured (or "holey") fiber or any other appropriate type of specialized fiber. Additionally, the optical fiber may be made of any suitable material such as, for example, pure silica, doped silica, composite glasses, plastic or sapphire.

The optical fiber is mounted under tension in a packaging assembly. Those skilled in the art will understand that the packaging assembly may include various elements, components, structures, mechanisms and the like that are configured to house, support and/or protect the section of the optical fiber along which the optical filter is provided. In some embodiments, the packaging assembly may be a multi-material packaging assembly provided with a combination of temperature-compensating elements having different CTEs. These temperature-compensating elements expand or contract in response to temperature variations in such a way as to impart a certain amount of axial strain to the optical fiber in order to compensate for thermally induced refractive index variations in the optical fiber and, thus, to maintain the spectral response of the optical filter substantially constant.

Numerous designs and configurations of packaging assemblies for fiber-based optical filters are known to those skilled in the art and can be used in implementing the method described herein. Referring to FIGS. 1 to 4, there is schematically illustrated a passive athermal packaging assembly 10 for an optical filter 12 provided along a section of an optical fiber 14 to which the present method can be applied. The packaging assembly 10 and the optical fiber 14 provided with the optical filter 12 together form a packaged optical filter device 16.

It will be understood that the packaging assembly configuration illustrated in FIGS. 1 to 4 is provided herein by way of example only, and that other embodiments of the present method may be applied to a variety of different packaging assembly configurations without departing from the scope of the invention. Other possible suitable packaging assemblies are described, for example, in U.S. Pat. No. 6,859,583 (LACHANCE et al.) and U.S. Pat. No. 7,711,224 (PELLETIER et al.), the entire contents of each of which are incorporated herein by reference.

In FIGS. 1 to 4, the packaging assembly 10 first includes an elongated outer casing 18 which surrounds the optical fiber 14 along the section thereof provided with the optical filter 12. In the illustrated example, a protective tubing 20 (e.g., a recoating) is disposed over the optical filter 12 in order to protect its integrity during assembly or when subjected to shock or vibration. The outer casing 18 has first and second opposite ends 22a, 22b to which the optical fiber 14 is connected through mechanical structures, in order to mount the optical fiber 14 under tension.

In FIGS. 1 to 4, the optical fiber 14 is connected to the outer casing 18 at the first end 22a thereof through an athermalizing module 24. The athermalizing module 24 includes several components selected, configured and assembled in such a way as to provide a compensation of the tension in the optical fiber 14 due to temperature variations, thereby ensuring that the spectral response of the optical filter 12 remains substantially constant under temperature fluctuations.

Referring still to FIGS. 1 to 4, the athermalizing module 24 generally includes an inner casing 26, an expansion sleeve 28 and a first ferrule connector 30. The inner casing 26 is inserted concentrically within the elongated outer casing 18 so as to extend along a portion of the optical fiber 14. By way of example, in FIG. 2, the inner casing 26 is inserted slightly more than halfway through the outer casing 18.

The expansion sleeve 28 extends concentrically between the inner and outer casings 26, 18 and has opposite ends 32a, 32b affixed to the inner and outer casings 26 and 18, respectively. By way of example, as depicted in FIGS. 1 and 2, the expansion sleeve 28 may be connected to the inner and outer casings 26, 18 at its innermost and outermost ends 32a, 32b, respectively, although the opposite or another configuration may be used in other embodiments.

Figure 2:
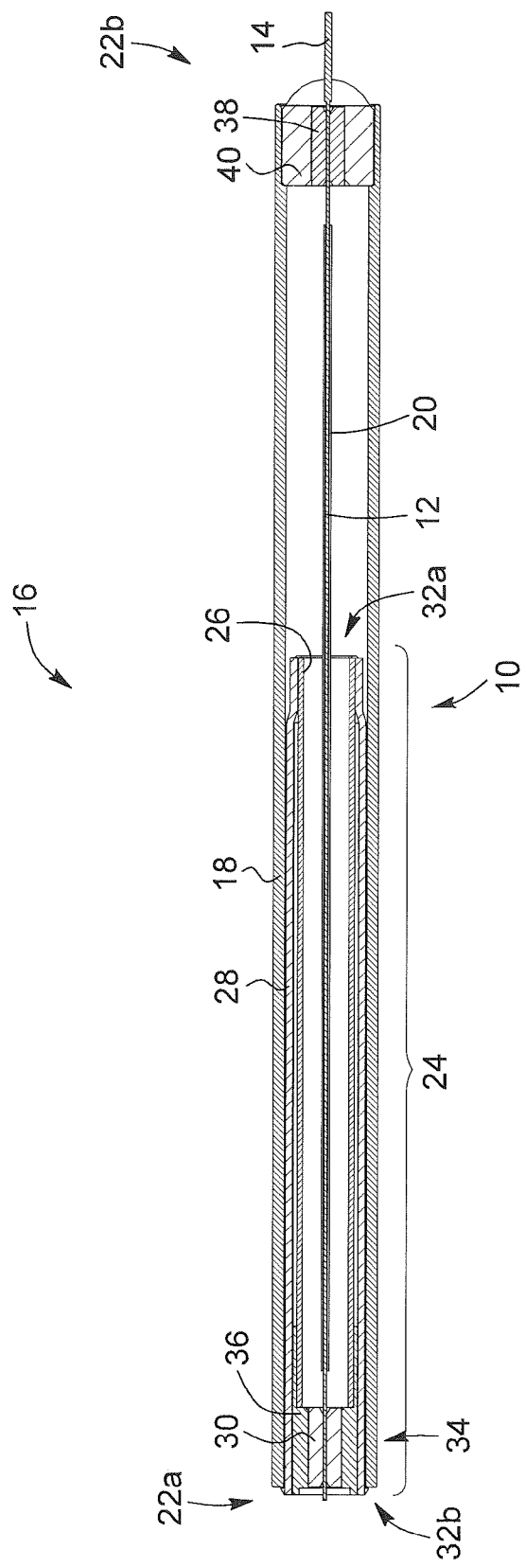
FIG. 2 is a schematic cross-sectional side view of a passive athermal packaging assembly.
Figure 3:
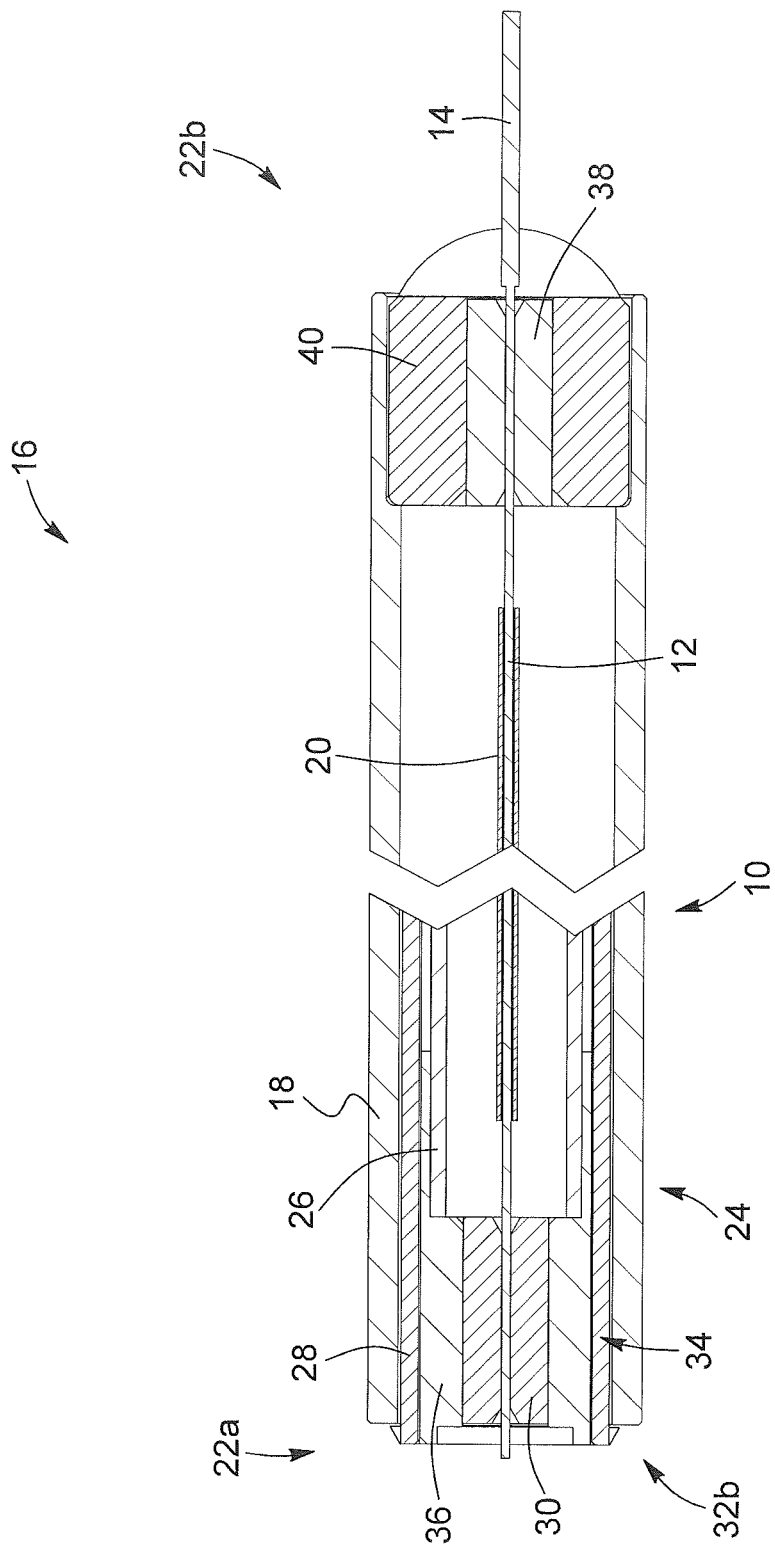
FIG. 3 is a close-up, cross-sectional side view of the axial extremities of the passive packaging assembly of FIG. 2.
Figure 4:
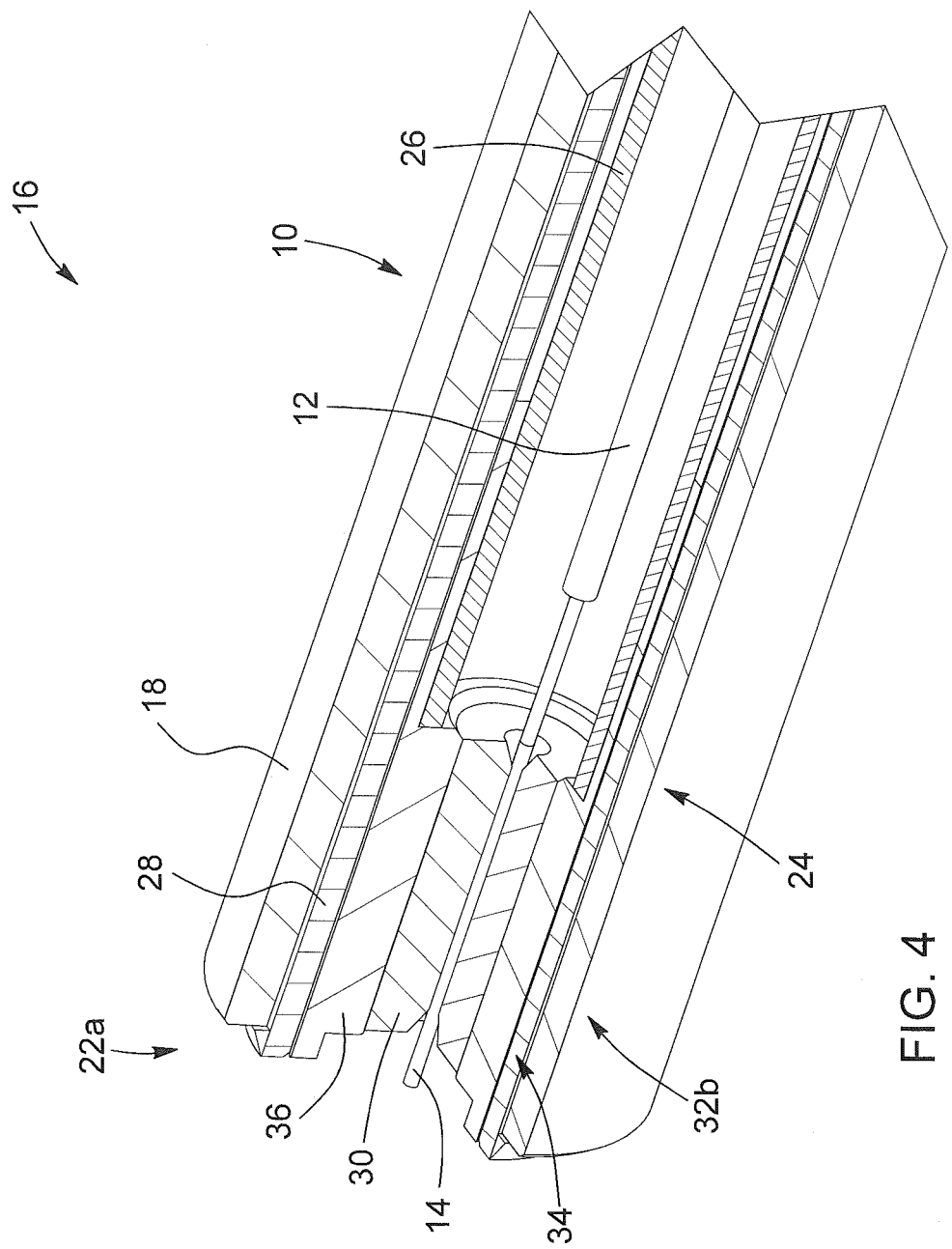
FIG. 4 is a partial perspective cross-sectional view of an athermalizing module provided at one extremity of the packaging assembly of FIG. 2.

In FIGS. 1 to 4, the first ferrule connector 30 is affixed to the optical fiber 14 and extends within the outer casing 18 at the first end 22a thereof. The first ferrule connector 30 is also connected to the inner casing 26 at an anchoring point 34 distant from the end of the inner casing 24 that is attached to innermost end 32a of the expansion sleeve 28. By way of example, the first ferrule connector 30 may be connected to the inner casing 26 through a ferrule sleeve 36 made of a material having a low coefficient of thermal expansion. As depicted in FIGS. 2 and 3, the ferrule sleeve 36 may have one end that receives the first ferrule connector 30 and another end that receives the outermost end of the inner casing 26. Those skilled in the art will understand that, in this configuration, the expansion sleeve 28 counteracts temperature-induced length variations of the optical fiber 14 and that the different components of the packaging assembly 10 are selected and configured in such a way as to provide the proper balance between the different competing forces acting on the optical fiber 14.

Referring to FIGS. 2 and 3, a second ferrule connector 38 may be provided affixed to the optical fiber 14 at the second end 22b of the outer casing 18, distally of the athermalizing module 24. The second ferrule connector 38 is operationally connected to the outer casing 18, for example through a sleeve 40 made of a same material as the outer casing 18.

The packaging assembly 10 illustrated in FIGS. 1 to 4 can accommodate any type of fiber-based filter whose spectral response can be adjusted by changing the strain applied thereto. In particular, it is to be noted that the wavelength-tuning method described herein can be applied not only to a packaging assembly implemented as an athermal system for wavelength compensation in Fiber Bragg gratings, but also to a packaging assembly implemented as a hyperthermal system for use in tunable filters. It is also to be noted that other packaging assembly configurations can be designed to accommodate multiple fibers on a single tube configuration by adding a plurality of ferrules on each end of the packaging assembly. Such multi-fiber configurations can still allow the characteristic or operating wavelength of each fiber to be adjusted individually, thereby maintaining high manufacturing yield.

In some embodiments, the present method may be applied to a packaging assembly designed with a very compact form factor due to the concentric arrangement of its components, which may have a tubular or another other shape and be made of materials having different positive CTEs. For example, in the athermal system implementation described above, two of the concentric components are made of low-CTE material (i.e., the outer casing 18 and the inner casing 26) and one is made of a high-CTE material (i.e., the expansion sleeve 28). In an embodiment, a low-CTE material may be defined as a material having a coefficient of thermal expansion less than $10 \times 10^{-6}$ meter per meter-kelvin [m/(m·K)], while a high-CTE material may be defined as a material having a coefficient of thermal expansion greater than $10 \times 10^{-6}$ m/(m·K). However, those skilled in the art will understand that an opposite arrangement of low and high-CTE materials can be used for a hyperthermal system implementation.

The different components of the packaging assembly may be made of various standard materials, selected to achieve desired performance characteristics or meet desired specifications. By way of example, suitable low-CTE materials (e.g., for the outer and inner casings 18, 26, the first and second ferrule connector 30, 38 and their respective sleeves 36, 40 in FIGS. 1 to 4) may include, without being limited to, Invar (trademark), Kovar (trademark) or titanium. Likewise, suitable high-CTE materials (e.g., for the expansion sleeve 28 in FIGS. 1 to 4) may include stainless steel, copper or aluminum. Those skilled in the art will also understand that although the packaging assembly illustrated in FIGS. 1 to 4 has a concentric arrangement, this need not be the case in other embodiments, where other types of packaging arrangement (e.g., a linear packaging arrangement) can be used.

Packaging assemblies for fiber-based optical filters such as the one described above and the like are typically assembled and tested using environmental stress screening. As known in the art, the term "environmental stress screening" refers to a procedure in which newly manufactured or repaired products, devices or components are subjected to tests conducted under environmental stresses in order to detect defects and flaws related to their assembly and screening. Such tests may include, for example, temperature cycling, high-temperature burn-in, temperature-humidity cycling combination, or any other method deemed appropriate to detect assembly- and screening-related defects. However, either or both of the assembly and the screening processes are likely to cause drift errors and other inaccuracies in the spectral response of the optical filter, which in some cases can result in a shift in the characteristic or operating wavelength of the optical filter ranging from a few pm up to a few hundreds of pm. These post-assembly shifts and deviations often cannot be controlled precisely, since they originate from many different sources including, without being limited to, post-curing epoxy shift, adhesive and polymer stress relaxation, unpredictable micro-motions of mechanical parts, and the like.

Post-Assembly Wavelength-Tuning Method for an Fiber-Based Optical Filter

As outlined above, in accordance with an aspect, there is provided a post-assembly wavelength-tuning method for an optical filter provided along an optical fiber, the optical fiber being mounted under tension in a packaging assembly. The method generally aims to compensate for or at least reduce assembly- and screening-related spectral deviations between a post-assembly of the optical filter and a target spectral response. The method may be applied to or implemented on a packaged optical filter device where the filter is a fiber Bragg grating, such as that in FIGS. 1 to 4, or another type of packaged optical filter device.

Spectral Deviations Measurements

The present method first includes a step of measuring a post-assembly spectral response of the fiber-based optical filter and of determining therefrom a spectral deviation with respect to a target spectral response.

Figure 5:
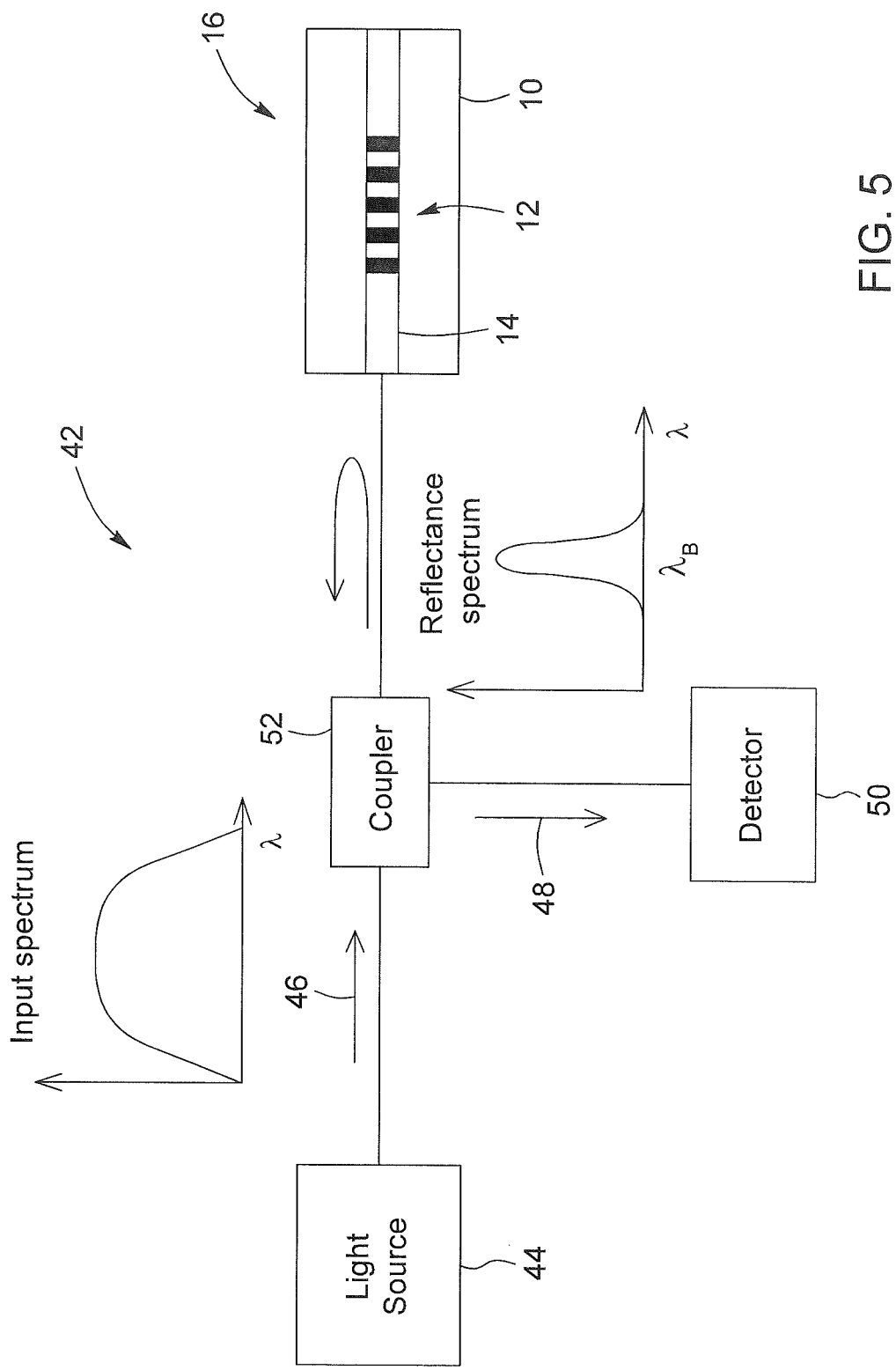
FIG. 5 is schematic representation of a measurement set-up for measuring the post-assembly spectral response of a fiber-based optical filter, which can be used in an embodiment of the method.

Referring to FIG. 5, there is schematically depicted an exemplary set-up 42 for measuring the post-assembly reflectance spectrum of a FBG-based optical filter 12. The optical filter 12 is provided on an optical fiber 14, which is itself mounted in a packaging assembly 10 to form a packaged optical filter device 16. In the illustrated measurement set-up 42, a broadband or broadly tunable light source 44, for example amplified spontaneous emission (ASE) source, a swept-wavelength system (SWS) or an optical vector analyzer (OVA), illuminates the optical filter 12 with an input optical signal 46. A portion 48 of the input signal 46 is reflected by the optical filter 12 and collected by a detector 50, for example an optical spectrum analyzer, an SWS, an OVA or another appropriate type of spectral measurement device. It will be understood that in some implementations, the light source 44 and the detector 50 may be provide as or integrated into a single device or system having both illumination and detection capabilities. A coupler 52, for example an optical circulator, may be provided to couple the input signal 46 into the optical filter 12, and to couple the reflected signal 48 from the optical filter 12 onto the detector 50.

The signal collected by the detector 50 can be analyzed and processed using standard techniques to extract therefrom the post-assembly reflectance spectrum of the optical filter 12 which, in the example of FIG. 5, consists of a narrowband spectrum having a single reflectance peak centered at the Bragg wavelength $\lambda_B$. As described above, as a result of the assembly and/or the screening process, the measured post-assembly spectral response of the optical filter may deviate from the target spectral response. In some implementations, this spectral deviation may be characterized by a shift in the value of the Bragg wavelength $\lambda_B$ of the optical filter 12. By way of example, in one implementation, the optical filter may be designed to have a target Bragg wavelength equal to 1550.400 nm. However, after assembly and environmental stress screening, the actually measured post-assembly Bragg wavelength of the filter may instead be equal to 1550.440 nm corresponding to a Bragg wavelength shift of 40 pm from the target Bragg wavelength.

Laser Welding Operations

In order to correct or at least mitigate the spectral deviation thus determined, the present method further includes a step of forming one or more laser-welded zones on at least one packaging component of the packaging assembly, so as to cause a permanent deformation of the at least one packaging component.

As discussed further below, the at least one packaging component on which one or more laser-welded zones are formed may be embodied by any structural element of the packaging assembly which is mechanically coupled to the optical fiber, optically accessible from outside of the packaging assembly, and made of a material suitable for laser welding. It is to be noted that although, in some embodiments, the one or more laser-welded zones may be formed on a plurality of packaging components of the packaging assembly, the packaging component or components will, for convenience, be referred to hereinafter in the singular. Likewise, although a single laser-welded zone may be provided in some embodiments, the laser-welded zone or zones will be referred to hereinafter in the plural.

The laser-welded zones may be formed by irradiating the packaging component with a laser beam having beam characteristics selected to cause localized heating and melting of the packaging component. In particular, the energy, spatial profile, spectral profile, pulse characteristics (for a pulsed laser beam) and other beam characteristics may be selected so as to confine the energy transfer and the increase in temperature associated thereto to a small localized area on the packaging component and, thus, avoid or mitigate generalized heating of the packaging component and potential damages to the optical filer and/or the packaging assembly. Those skilled in the art will understand that the laser beam may be either continuous-wave or pulsed. Furthermore, various types of laser sources appropriate to generate laser beams having suitable beam characteristics are known in the art and may be used to perform the present method such as, for example, $CO_2$ lasers, YAG lasers, optical fiber lasers, femtosecond lasers, and the like.

Figure 6:
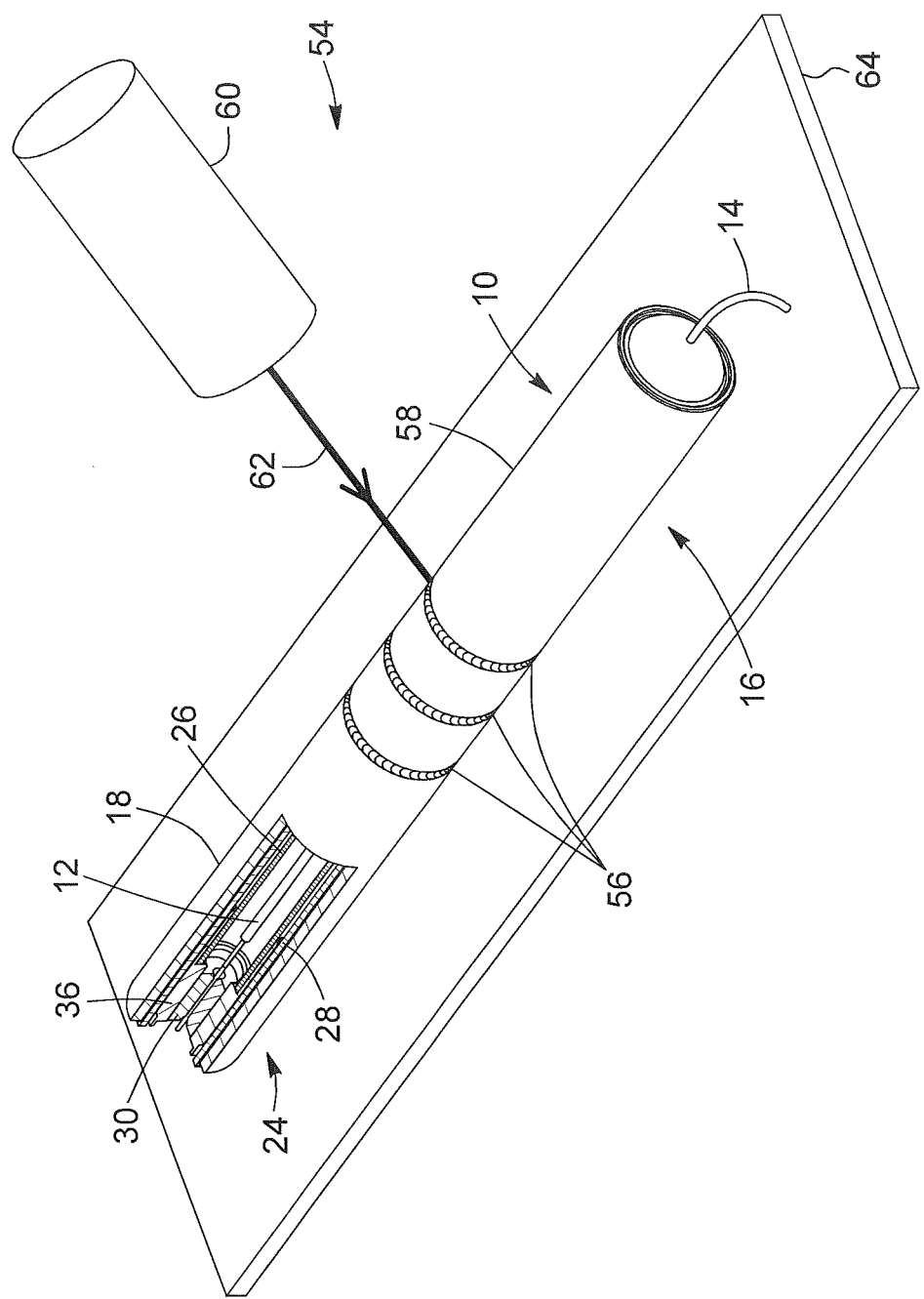
FIG. 6 is schematic representation of a laser-welding set-up for forming one or more laser-welded zones on a packaging component of the packaging assembly of a packaged optical filer device, which can be used in an embodiment of the method.

Referring to FIG. 6, there is schematically illustrated an exemplary set-up 54 for forming one or more laser-welded zones 56 on a packaging component 58 of the packaging assembly 10 of a packaged optical filter device 16, which corresponds to that described above and depicted in FIGS. 1 to 4. In the example of FIG. 6, the laser-welding set-up 54 includes a laser source 60 which is configured to emit and direct a beam 62 of laser energy onto the packaging component 58 to be welded, and a positioning assembly 64 on which the packaged optical device 16 can be mounted in translation along and/or in rotation about one or more axes. The positioning assembly 64 can allow the packaged optical device 16 to be precisely aligned with the welding laser beam 62 during the formation of the laser-welded zones 56.

In the implementation of FIG. 6, the packaging component 58 to be welded corresponds to the outer casing 18 of the packaging assembly 10 and is part of its athermalizing module 24, which provides passive compensation of temperature-induced elongations and contractions along the optical fiber 14. However, in other embodiments, other elements of the packaging assembly 10 may be used as the one or more packaging components 58 to be welded. It is also to be noted that although the packaging component 58 to be welded in FIG. 6 is arranged concentrically around the optical fiber 14, this need not be the case in other embodiments.

As mentioned above, the packaging component to be welded should be optically accessible from outside of the packaging assembly by the welding laser beam. The term "optically accessible" is intended to refer herein to the fact that laser energy can be delivered to the packaging component to form laser-welded zones thereon without requiring the packaged optical device to be, partially or entirely, disassembled, opened, removed or otherwise reconfigured.

In some implementations, the packaging component to be welded may be directly accessible to the welding laser beam, for example when the packaging component is the outermost one of a plurality of elements arranged concentrically with respect to one another around the optical fiber. This is the case in FIG. 6, where the packaging component 58 to be welded is the outer casing 18 of the packaging assembly 10.

Figure 9B:
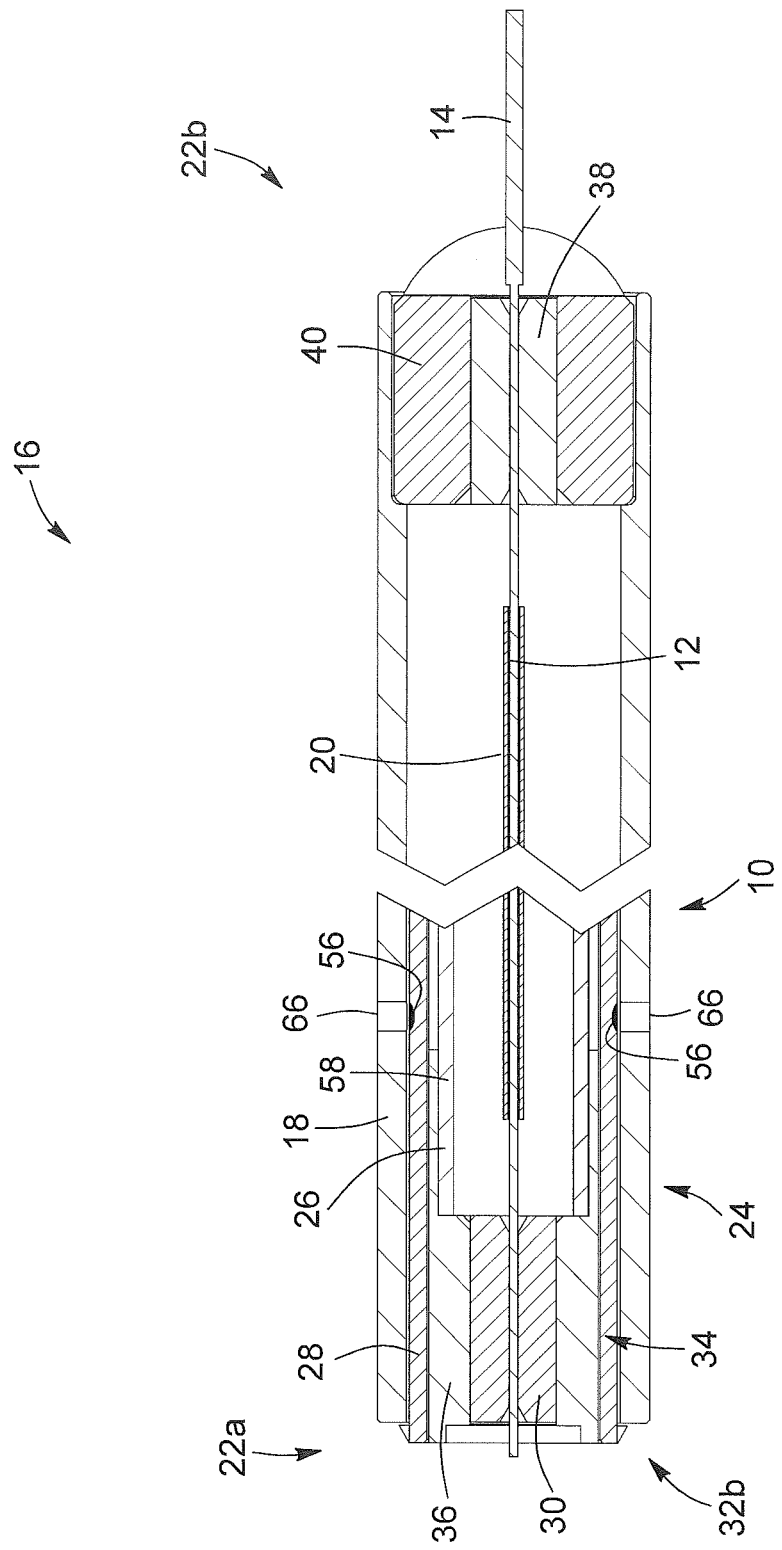
FIG. 9B is a cross-sectional side view of the axial extremities of the packaged optical filter device of FIG. 9A.

However, in other implementations, the packaging component 58 to be welded need not be the outermost element of the packaging assembly 10. For example, referring to FIGS. 9A and 9B, in some implementations of the packaged optical filter device 16, dedicated optical apertures 66 may be added to the design and formed during the manufacturing of the device 16 in order to provide optical access to and inscribe laser-welded zones 56 on the packaging component 58 of the packaging assembly 10, which otherwise would not have been optically accessible. For example, in FIGS. 9A and 9B, the packaging component 58 is the expansion sleeve 28, although another internal element of the packaging assembly 10 may be used in other embodiments. The optical apertures 66 may have various shapes and arrangements to allow for the laser-welded zones 56 to be inscribed on the packaging component 58 and for the post-assembly spectral response of the optical filter 14 to be corrected, while maintaining the integrity of the device 16. In the embodiment of FIGS. 9A and 9B, the optical apertures 66 have a circular shape, although other shapes may be used in other embodiments, for example a slit-like shape.

The localized heating and the subsequent cooling in the welded region can induce post-weld residual stresses in the packaging component. The theory of the post-weld residual stress generation by laser welding is well known in the art, as exemplified in the two following technical papers: Zhou et al., "*Thermal-Mechanical Modeling of Pulsed Laser Keyhole welding of* 304 *Stainless Steels*", Journal of Engineering and Technology, vol. 1, no. 3, pp. 172-179 (2012); Costa et al., "*Residual stresses Analysis of ND-YAG Laser Welded Joints*", vol. 17, no. 1, pp. 28-37 (2010). It will be understood that, in embodiments of the present method, the beam characteristics of the laser beam are selected to deliver energy in a way such as to generate post-weld residual stresses that are permanently induced in the packaging components.

It will also be understood that, while these deliberately induced post-weld residual stresses may be relatively small, they should also remain sufficiently large to cause a permanent deformation of the laser-welded packaging component that is mechanically coupled to the packaging component. As used herein, the term "permanent deformation" refers to a post-weld change in size and/or shape of the packaging component which is essentially non-reversible under normal operating conditions and for the intended lifetime of the packaged optical fiber device. In some embodiments, the permanent deformation of the laser-welded packaging component can result in a longitudinal compressive strain, although a tensile strain and/or a differently oriented strain may be produced in other embodiments.

Since the packaging component is mechanically coupled to the optical fiber, the permanent deformation of the packaging component can induce a modification in length of the optical fiber. In turn, this modification in length of the optical fiber can change the measured post-assembly spectral response of the optical filter to compensate for the measured spectral deviation. As used herein, the term "mechanically coupled" and variants thereof mean that the laser-welded packaging component and the optical fiber are physically connected or related, either directly or indirectly, to ensure that the post-weld, permanent mechanical deformation of the packaging component can produce a load that changes the length of the optical fiber in such a way as to compensate for a spectral deviation measured in the post-assembly spectral response of the optical filter.

The packaging component on which the laser-welded zones are formed can be made of any suitable material which can undergo a permanent deformation as a result of residual stresses induced by laser welding. By way of example, the packaging component may be made of metal, glass, ceramic or a combination thereof. Those skilled in the art will understand that in order for the change in length to be permanent, the residual stresses should not be released in the operating temperature range of the filter and over the lifetime of the device. High-melting point alloys, such as ferrous alloys are particularly well suited to retain post-weld residual stresses over the standard temperature range of fiber-based optical filter applications (e.g., from $-50°$ C. to $+125°$ C.). Non-limiting examples of suitable materials for the packing component to be welded broadly include ceramics, glass, Invar, Kovar, stainless steel alloys, other steel alloys, tungsten, titanium alloys, brass, silver alloys, and the like. In some embodiments, the packaging component may have a coefficient of thermal expansion ranging from about $0.1 \times 10^{-6}$ m/(m·K) to about $30 \times 10^{-6}$ m/(m·K). Of course these values of coefficient of thermal expansion are provided for illustrative purposes only and can differ in other embodiments.

Figure 7A:
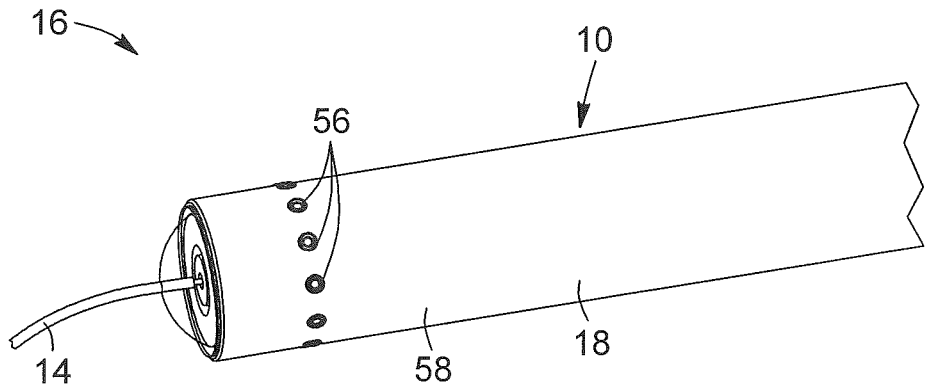
FIGS. 7A to 7C schematically illustrate three different weld patterns of laser-welded zones, in accordance with three embodiments, where the laser-welded zones are formed along the circumferential (FIG. 7A), the longitudinal (FIG. 7B) and the helical (FIG. 7C) direction of the packaging component.
Figure 7B:
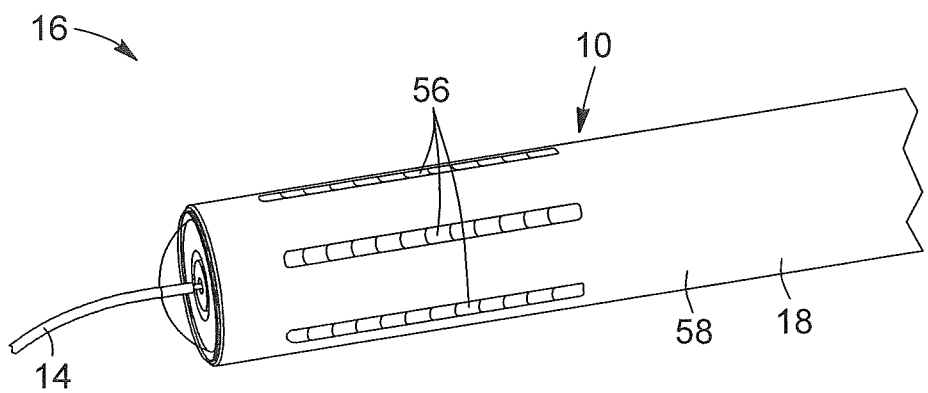
Figure 7C:
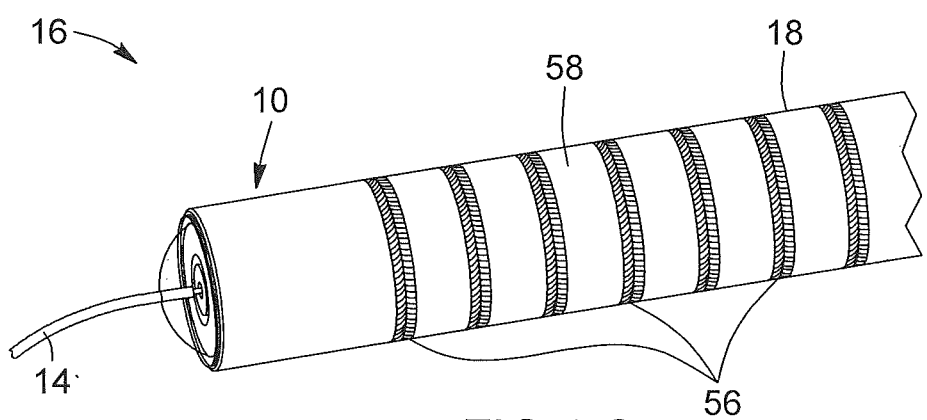

It will be understood that the one or more laser zones may have various shapes and geometries. In particular, while the laser-welded zones 56 are provided as axially spaced and circumferentially extended rings in the example of FIG. 6, other weld patterns may be used including single-dots (see FIG. 7A) and straight lines (see FIGS. 7B and 7C), to form the laser-welded-zones 56 along the circumferential (FIGS. 6 and 7A), the longitudinal (FIG. 7B), and the helical (FIG. 7C) direction of the packaging component (e.g., the outer casing in FIGS. 6 and 7A to 7C and the expansion sleeve in FIGS. 9A and 9B).

Referring to FIG. 6, each laser-welded zone 56 may be provided at any location along the packaging component 58 to be welded (e.g., the outer casing 18). Also, in implementations where multiple laser-welded zones 56 are provided, the laser-welded zones 56 may be distributed on the one or more packaging component of the packaging assembly 10 according to a variety of patterns. As those skilled in the art will readily understand, the weld pattern of the laser-welded zones 56 may depend on various factors including, without limitation: (i) the magnitude of the spectral deviation to be compensated for; (ii) the amount of permanent deformation to be achieved on the packaging component; (iii) the accessibility of the packaging component; (iv) the configuration and geometry of the packaging assembly; and (v) the arrangement of the laser-welding set-up used to formed the laser-welded zones.

It will be understood that the post-weld, permanent deformation undergone by the packaging component may be used to shift the spectral response of the optical filter either toward lower of higher wavelengths, depending on how the laser-welded packaging component is mechanically coupled to the optical fiber. More specifically, as a tensile load applied along the length of the optical fiber results in an increase of the characteristic wavelength of the optical filter, a deformation (e.g., a contraction) of the laser-welded packaging component may act to either increase or decrease this characteristic wavelength depending on the mechanical interaction between the laser-welded packaging component and optical fiber. For example, in the packaged optical filter device 16 illustrated in FIG. 8, providing laser-welded zones 56 on the outer casing 18 will generally tend to decrease the characteristic wavelength of the optical filter 12, thus allowing for the compensation of positive spectral deviations from a target spectral response. In contrast, in the packaged optical filter device 16 illustrated in FIGS. 9A and 9B, providing laser-welded zones 56 on the expansion sleeve 28 will generally tend to increase the characteristic wavelength of the optical filter 12, thus allowing for the compensation of negative spectral deviations from a target spectral response.

It will be noted that a significant advantage of the post-assembly wavelength-tuning method described herein is that it can provide an accurate, precise and repeatable procedure for correcting wavelength shift and other post-assembly spectral deviations of packaged optical filter devices. In particular, it has been found that forming a same pattern of laser-welded zones on packaging components of devices designed with the identical physical characteristics can predictably and consistently yield a same value of wavelength correction. Additionally, in some implementations, laser-welded zones can be made small enough so that the wavelength correction associated with one zone is minute, thereby allowing a fine and accurate control to be achieved over the total wavelength correction by careful selection of the number of laser-welded zones to be formed. Stated otherwise, the more numerous the laser-welded zones required to achieve a certain wavelength correction are, the greater the achievable correction accuracy will be.

Figure 10:
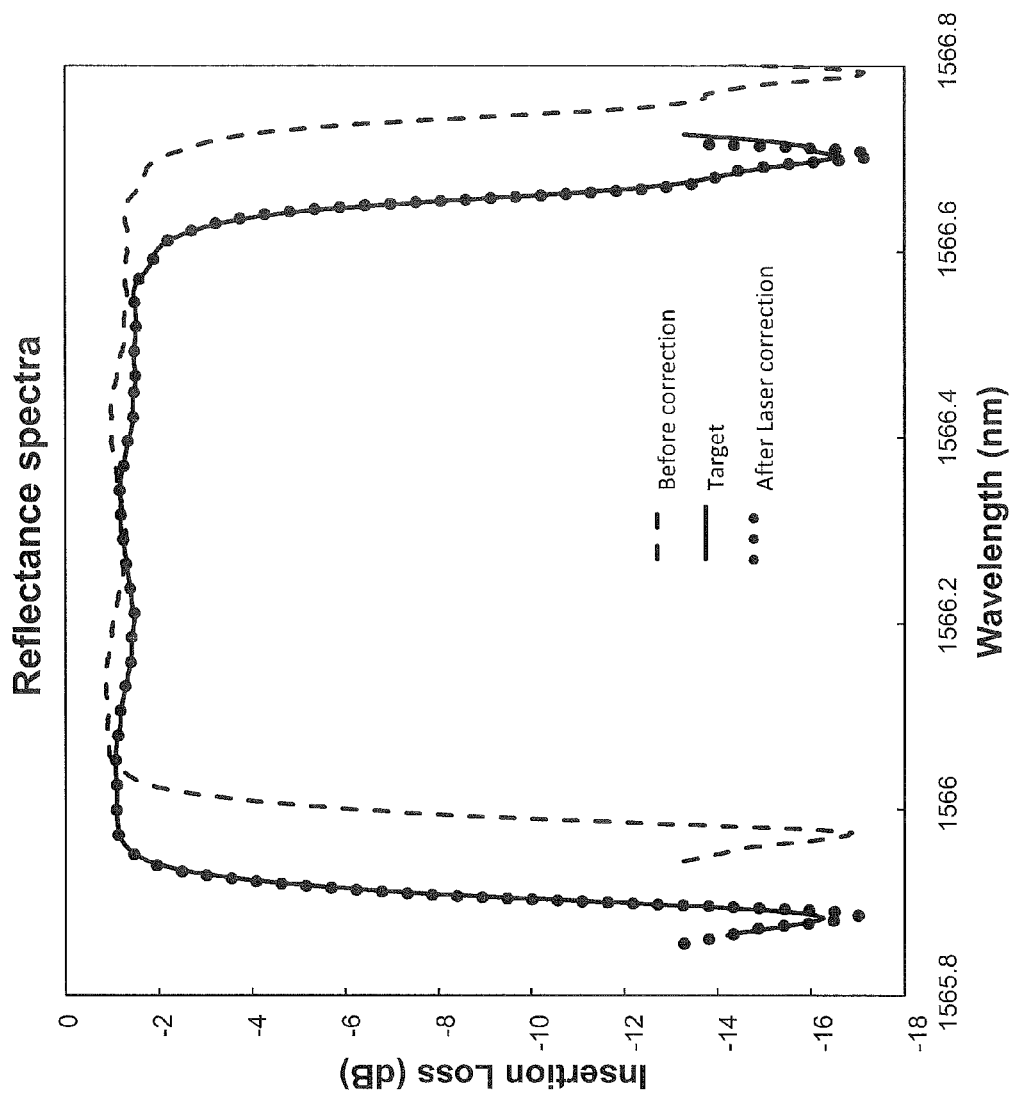
FIG. 10 shows the measured post-assembly spectral response (dashed line) as a function of wavelength of an embodiment of a packaged optical filter device, the theoretical target spectral response (solid line) for the packaged optical filter device, and the measured post-weld spectral response (dotted line) of the packaged optical filter device obtained after applying the wavelength-tuning method described herein.

Referring to FIG. 10, there is illustrated the measured post-assembly but pre-weld spectral response (dashed line) as a function of wavelength of an embodiment of the packaged optical filter device. FIG. 10 also depicts the target spectral response (solid line) for the same embodiment of the packaged optical filter device. It can be seen that the reflectance peak of measured post-assembly spectral deviates non-negligibly from that of the target spectral response. FIG. 10 further illustrates the post-weld spectral response (dotted line) of the embodiment of the packaged optical filter device measured after forming laser-welded zones on a packaging component of the packaging assembly. It is seen that by applying the laser-welding-based wavelength-tuning method described herein, the spectral response of the packaged optical filter device can be changed in such a way as to compensate for the measured spectral deviation. Indeed, in the example of FIG. 10, the post-weld spectral response is seen to coincide substantially with the target spectral response.

As known in the art, modern laser systems can provide a very accurate and precise control of the laser beam characteristics, which makes technologically possible the formation of laser-welded zones having very accurate shape, size and patterns, and thus allows for an accurate wavelength correction to be achieved. In some embodiments, this accuracy is sufficient to allow the post-assembly wavelength-tuning method to be carried out without the need for real-time feedback of the spectral response of the filter. In particular, it has been demonstrated that, in some implementations, the method described herein can be used on athermal FBG-based filters without in situ monitoring to achieve wavelength shift corrections an accuracy of 95% of the desired correction. Accordingly, in some embodiments of the method, if a target wavelength correction of 100 pm is desired, the actually achieved wavelength correction may range from 95 to 105 pm, while for a target wavelength correction of 20 pm, the actually achieved wavelength may range from 19 to 21 pm. Of course, these numerical values are provided for illustrative purposes only and may differ in other implementations of the method. It is also to be noted that in some embodiments, the wavelength-tuning method may be performed iteratively until the spectral deviation between the actually measured post-assembly spectral response of the optical filter and the target spectral response becomes less than a predetermined threshold.

In some implementations, the method step of measuring the post-assembly spectral response of a fiber-based optical filter to determine a spectral deviation to be compensated for along with the step of forming the laser-welded zones on the packaging component of the packaging assembly hosting the fiber-based optical filter can be automated and/or integrated into the production line of the packaged optical filter device, after the assembly and screening process.

In some implementations, due to the generally repeatable and predictable nature of the present method, a preliminary step of providing a correspondence table associating weld patterns to be used for forming the laser-welded zones and corrections to the spectral deviation measured in the post-assembly spectral response may be performed. In such implementations, the step of forming the laser-welded zones may involve accessing the correspondence table to determine at least one selected one of the weld patterns in view of the measured spectral deviation, and inscribing the at least one selected weld pattern on the packaging component so as to form the one or more laser-welded zones that would compensate for the measured spectral deviation.

Figure 8:
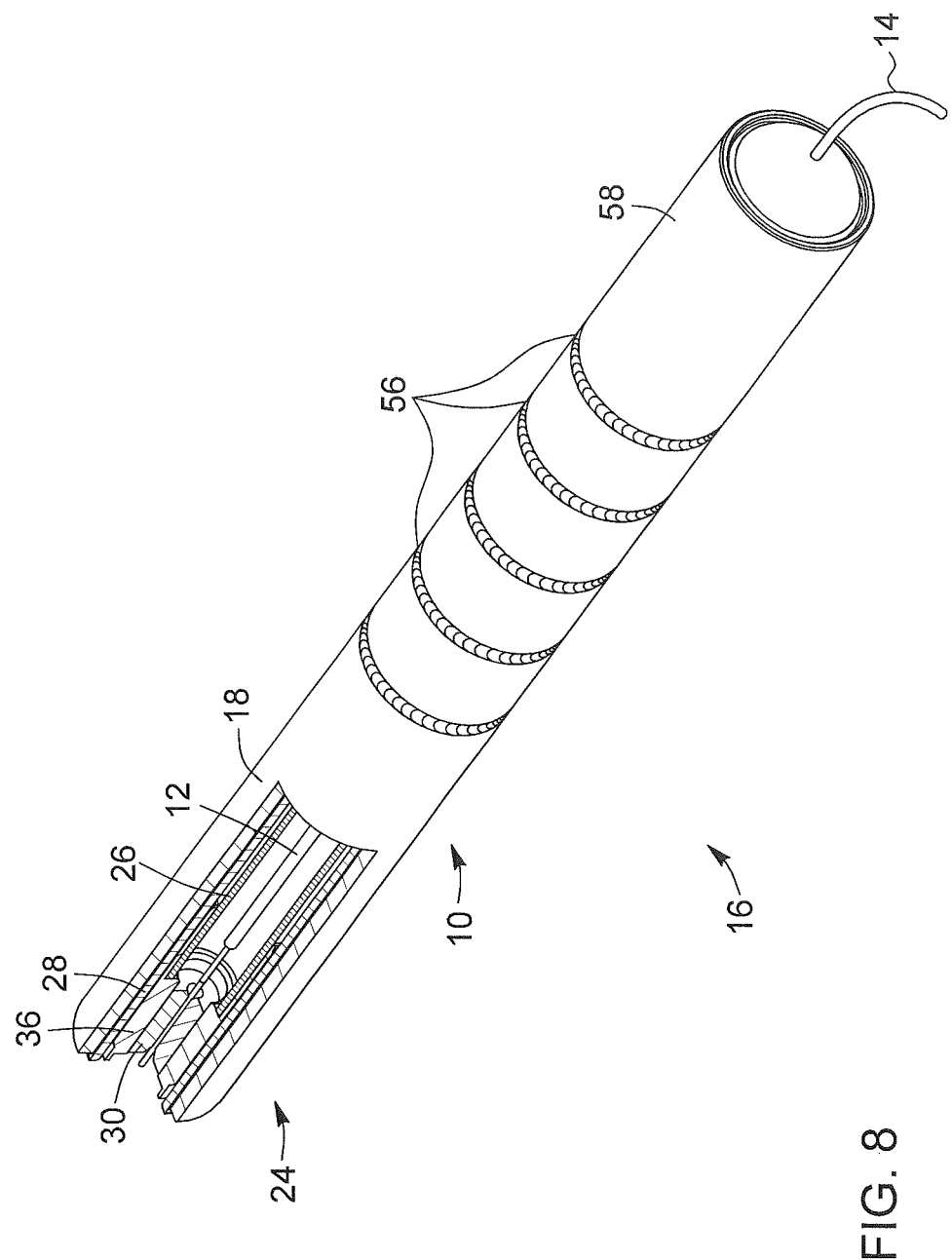
FIG. 8 is a schematic, partially cut-away perspective view of a laser-welded packaged optical filter device, in accordance with an embodiment.

By way of example, in the packaged optical filter device 16 of FIG. 8, each ring-shaped laser welded zone 56 (width: 100 microns; depth: 70 microns) induces a negative wavelength shift of 8 pm in the spectral response of the FBG-based optical filter 12 (central wavelength: 1550 nm; physical length: 130 millimeters). Accordingly, by forming five axially-spaced ring-shaped laser welded zones 56, a positive spectral deviation of 40 pm can be corrected or compensated for using the method described herein.

Those skilled in the art will understand that a correspondence table as described above may be established through an appropriate calibration process. An exemplary calibration process could involve the following steps: (i) measuring a pre-weld, post-assembly spectral response of a packaged optical filter device; (ii) inscribing one of a set of predetermined weld patterns into a packaging component of the packaged optical filter device; (iii) measuring the post-weld, post-assembly spectral of the packaged optical filter device; (iv) determining the spectral deviation associated with the inscribed weld patterns; and (v) repeating steps (i) to (iv) for each one of the predetermined weld patterns.

Laser-Welded Packaged Optical Filter Device

Referring now to FIG. 8, in accordance with another aspect, there is provided a laser-welded packaged optical filter device 16 including an optical fiber 14 having an optical filter 12 provided therealong, which may be embodied by a fiber Bragg grating. The packaged optical fiber device 16 also includes a packaging assembly 10 in which the optical fiber 14 is mounted under tension. In FIG. 8, the packaging assembly 10 corresponds to the passive athermal packaging assembly described above with reference to FIGS. 1 to 4, which is provided with an athermalized module 24 formed of plurality of elements arranged concentrically with respect to one another around the optical fiber 14 and including, among other elements, an inner casing 26, expansion sleeve 28 and an outer casing 18. Of course, numerous other concentric or non-concentric (e.g., linear) designs and configurations of packaging assemblies for fiber-based optical filters can be used in the packaged optical filter device described herein.

In FIG. 8, the packaging assembly 10 includes a packaging component 58 mechanically coupled, either directly or indirectly, to the optical fiber 14 and optically accessible from outside of the packaging assembly. In the illustrated embodiment, packaging component 58 is the outer casing 18 of the packaging assembly 10, although, other elements of the packaging assembly 10 can serve as the packaging component in other embodiments.

The packaging component 58 has one or more laser-welded zones 56 being formed thereon and causing a permanent deformation thereof. Hence, the packaging component 58 is generally made of a material suitable for laser welding, which can include, without being limited to, metals, glasses and ceramics. In FIG. 8, the laser-welded zones 56 are provided on the packaging component 58 as axially spaced and circumferentially extended rings, although other welding patterns (e.g., points, straight lines, helical lines and combinations thereof) may be used in other embodiments, as discussed above with reference to FIGS. 6 and 7A to 7C.

The permanent deformation may be an axial contraction of the packaging component 58, although other types of deformation could be produced in other embodiments. The permanent deformation undergone by the packaging component 58 induces a modification in length of the optical fiber 14. In turn, this fiber length modification causes a modification in the spectral response of the optical filter 12, which compensates for a spectral deviation from a target spectral response. Stated otherwise, the presence of the one or more laser-welded zones 56 on the packaging component 58 of the packaging assembly 10 allows for the spectral response of the optical filter 12 to differ from a pre-weld, post-assembly spectral response and while becoming closer to a target spectral response.

Of course, numerous modifications could be made to the embodiments described above without departing from the scope of the present invention.

The invention claimed is:

1. A post-assembly wavelength-tuning method for an optical filter provided along an optical fiber mounted under tension in a packaging assembly, the packaging assembly including at least one packaging component mechanically coupled to the optical fiber and optically accessible from outside of the packaging assembly, the method comprising:
    a) measuring a post-assembly spectral response of the optical filter and determining therefrom a spectral deviation with respect to a target spectral response; and
    b) forming one or more laser-welded zones on the packaging component along at least one of a longitudinal, a circumferential and a helical direction of the packaging component so as to cause a permanent deformation of said packaging component, the permanent deformation inducing a modification in length of the optical fiber and thereby changing the post-assembly spectral response of the optical filter to compensate for the measured spectral deviation.

2. The method according to claim 1, wherein step b) comprises irradiating the packaging component with a laser beam having beam characteristics selected to cause localized heating and melting of the packaging component, thereby forming the one or more laser-welded zones.

3. The method according to claim 1, comprising, before step a), a preliminary step of providing a correspondence table between weld patterns for the one or more laser-welded zones and corrections to the spectral deviation with respect to the target spectral response.

4. The method according to claim 3, wherein step b) comprises:
    accessing the correspondence table to determine at least one selected one of the weld patterns in view of the measured spectral deviation; and
    inscribing the at least one selected weld pattern on the packaging component so as to form the one or more laser-welded zones.

5. The method according to claim 1, wherein the packaging component is arranged concentrically around the optical fiber.

6. The method according to claim 1, wherein the packaging component consists of an outermost one of a plurality of elements arranged concentrically with respect to one another around the optical fiber.

7. The method according to claim 1, wherein the optical filter is a fiber Bragg grating.

8. The method according to claim 1, wherein the spectral deviation ranges from about 0.1 to about 800 picometers.

9. The method according to claim 1, wherein the packaging component is part of an athermalizing module configured to provide passive compensation of temperature-induced elongations and contractions of the optical fiber.

10. The method according to claim 1, wherein the packaging component is made of metal, glass or ceramic.

11. The method according to claim 1, wherein the packaging component has a coefficient of thermal expansion ranging from about $0.1 \times 10^{-6}$ m/(m·K) to about $30 \times 10^{-6}$ m/(m·K).

12. A packaged optical filter device comprising:
   an optical fiber having an optical filter provided therealong; and
   a packaging assembly in which the optical fiber is mounted under tension, the packaging assembly including at least one packaging component mechanically coupled to the optical fiber and optically accessible from outside of the packaging assembly, one or more laser-welded zones being formed on and causing a permanent deformation of the packaging component, the one or more laser-welded zones being formed along at least one of a longitudinal, circumferential or helical direction of the packaging component, the permanent deformation inducing a modification in length of the optical fiber and thereby compensating for a spectral deviation from a target spectral response.

13. The packaged optical filter device according to claim 12, wherein the optical fiber is a fiber Bragg grating.

14. The packaged optical filter device according to claim 12, wherein the packaging component is part of an athermalizing module configured to provide passive compensation of temperature-induced elongations and contractions along the optical fiber.

15. The packaged optical filter device according to claim 12, wherein the packaging component is made of metal, glass or ceramic.

16. The packaged optical filter device according to claim 12, wherein the packaging component is arranged concentrically around the optical fiber.

17. The packaged optical filter device according to claim 12, wherein the packaging component consists of an outermost one of a plurality of elements arranged concentrically with respect to one another around the optical fiber.

18. The packaged optical filter device according to claim 12, wherein the packaging component has a coefficient of thermal expansion ranging from about $0.1 \times 10^{-6}$ m/(m·K) to about $30 \times 10^{-6}$ m/(m·K).

19. A post-assembly wavelength-tuning method for an optical filter provided along an optical fiber mounted under tension in a packaging assembly, the packaging assembly including at least one packaging component mechanically coupled to the optical fiber and optically accessible from outside of the packaging assembly, the method comprising:
   a) measuring a post-assembly spectral response of the optical filter and determining therefrom a spectral deviation with respect to a target spectral response; and
   b) forming one or more laser-welded zones on the packaging component so as to cause a permanent deformation thereof, the permanent deformation inducing a modification in length of the optical fiber and thereby changing the post-assembly spectral response of the optical filter to compensate for the measured spectral deviation;
   the method comprising a preliminary step of providing a correspondence table between weld patterns for the one or more laser-welded zones and corrections to the spectral deviation with respect to the target spectral response.

20. The method according to claim 19, wherein step b) comprises irradiating the packaging component with a laser beam having beam characteristics selected to cause localized heating and melting of the packaging component, thereby forming the one or more laser-welded zones.

21. The method according to claim 19, wherein step b) comprises:
   accessing the correspondence table to determine at least one selected one of the weld patterns in view of the measured spectral deviation; and
   inscribing the at least one selected weld pattern on the packaging component so as to form the one or more laser-welded zones.

22. The method according to claim 19, wherein the packaging component is arranged concentrically around the optical fiber.

23. The method according to claim 19, wherein the packaging component consists of an outermost one of a plurality of elements arranged concentrically with respect to one another around the optical fiber.

24. The method according to claim 19, wherein the optical filter is a fiber Bragg grating.

25. The method according to claim 19, wherein the spectral deviation ranges from about 0.1 to about 800 picometers.

26. The method according to claim 19, wherein the packaging component is part of an athermalizing module configured to provide passive compensation of temperature-induced elongations and contractions of the optical fiber.

27. The method according to claim 19, wherein the packaging component is made of metal, glass or ceramic.

28. The method according to claim 19, wherein the packaging component has a coefficient of thermal expansion ranging from about $0.1 \times 10^{-6}$ m/(m·K) to about $30 \times 10^{-6}$ m/(m·K).

29. A post-assembly wavelength-tuning method for an optical filter provided along an optical fiber mounted under tension in a packaging assembly, the packaging assembly including at least one packaging component mechanically coupled to the optical fiber and optically accessible from outside of the packaging assembly, the method comprising:
   a) measuring a post-assembly spectral response of the optical filter;
   b) determining a spectral deviation of the spectral response of the optical filter with respect to a target spectral response;
   c) accessing a correspondence table providing a relationship between weld patterns for inscribing on the packaging component and corrections to the spectral deviation;
   d) determining at least one selected one of the weld patterns in view of the measured spectral deviation;
   e) forming one or more laser-welded zones on the packaging component according to the selected one of the weld patterns so as to cause a permanent deformation thereof, the permanent deformation inducing a modification in length of the optical fiber and thereby changing the post-assembly spectral response of the optical filter to compensate for the measured spectral deviation.

30. The method according to claim 29, wherein step e) comprises irradiating the packaging component with a laser beam having beam characteristics selected to cause localized heating and melting of the packaging component, thereby forming the one or more laser-welded zones.

31. The method according to claim 29, wherein step e) comprises forming the one or more laser-welded zones along at least one of a longitudinal, a circumferential and a helical direction of the packaging component.

32. The method according to claim 29, wherein the packaging component is arranged concentrically around the optical fiber.

33. The method according to claim 29, wherein the packaging component consists of an outermost one of a plurality of elements arranged concentrically with respect to one another around the optical fiber.

34. The method according to claim 29, wherein the optical filter is a fiber Bragg grating.

35. The method according to claim 29, wherein the spectral deviation ranges from about 0.1 to about 800 picometers.

36. The method according to claim 29, wherein the packaging component is part of an athermalizing module configured to provide passive compensation of temperature-induced elongations and contractions of the optical fiber.

37. The method according to claim 29, wherein the packaging component is made of metal, glass or ceramic.

38. The method according to claim 29, wherein the packaging component has a coefficient of thermal expansion ranging from about $0.1 \times 10^{-6}$ m/(m·K) to about $30 \times 10^{-6}$ m/(m·K).

* * * * *